July 19, 1955     S. W. LANGDON     2,713,292
METHOD AND APPARATUS FOR WRAPPING BOXES
Filed Jan. 22, 1949                           22 Sheets-Sheet 2

INVENTOR.
Samuel W. Langdon
BY Edward H. Cumpston
his ATTORNEY

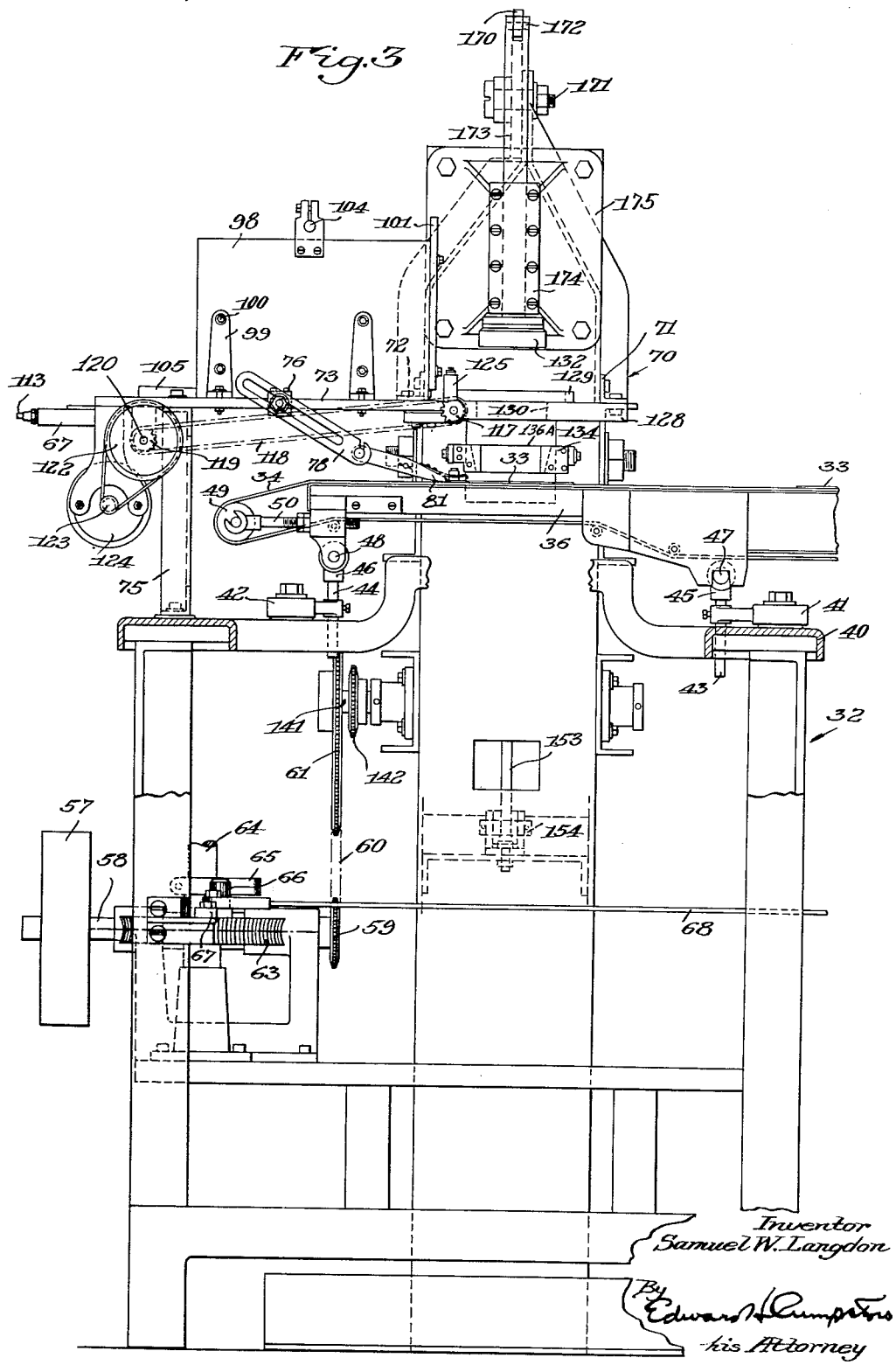

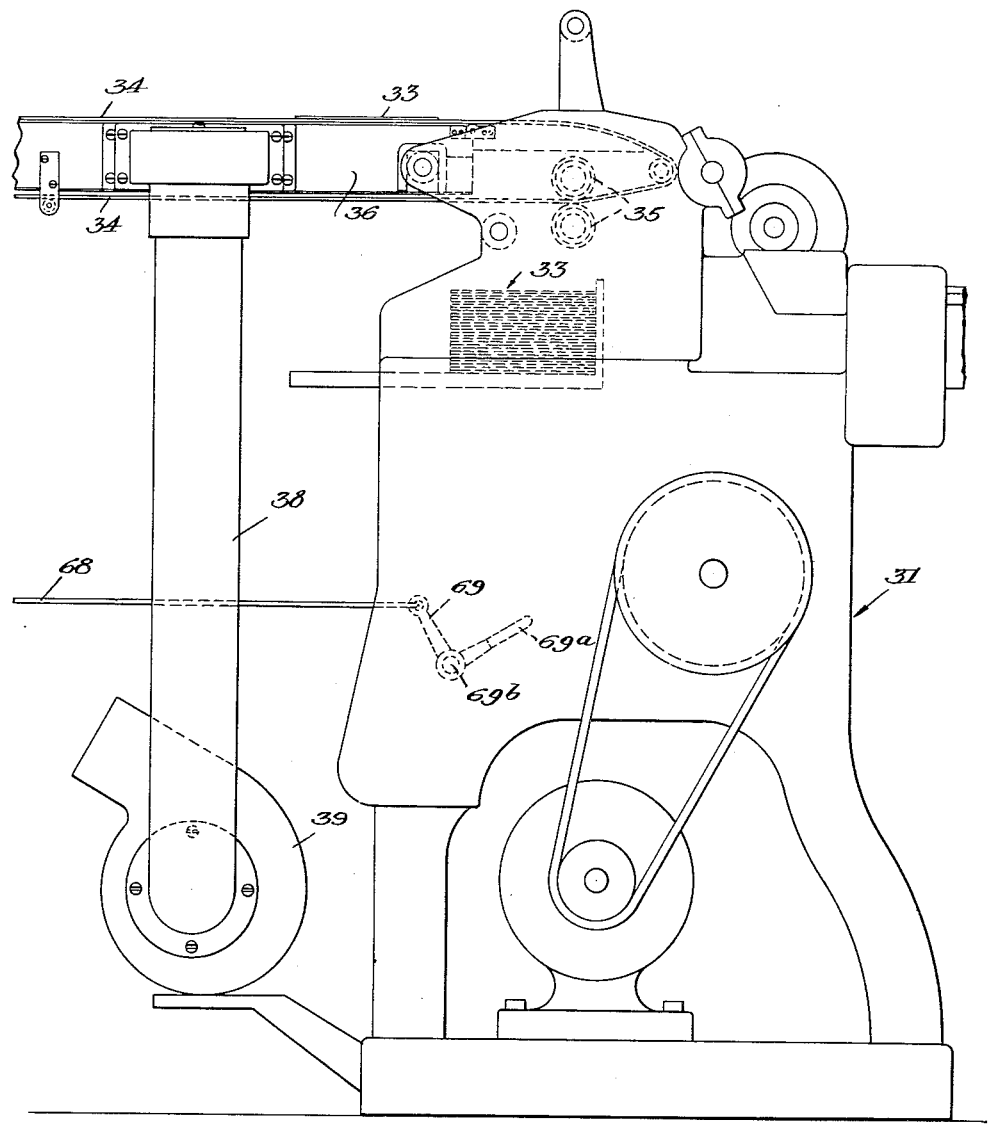

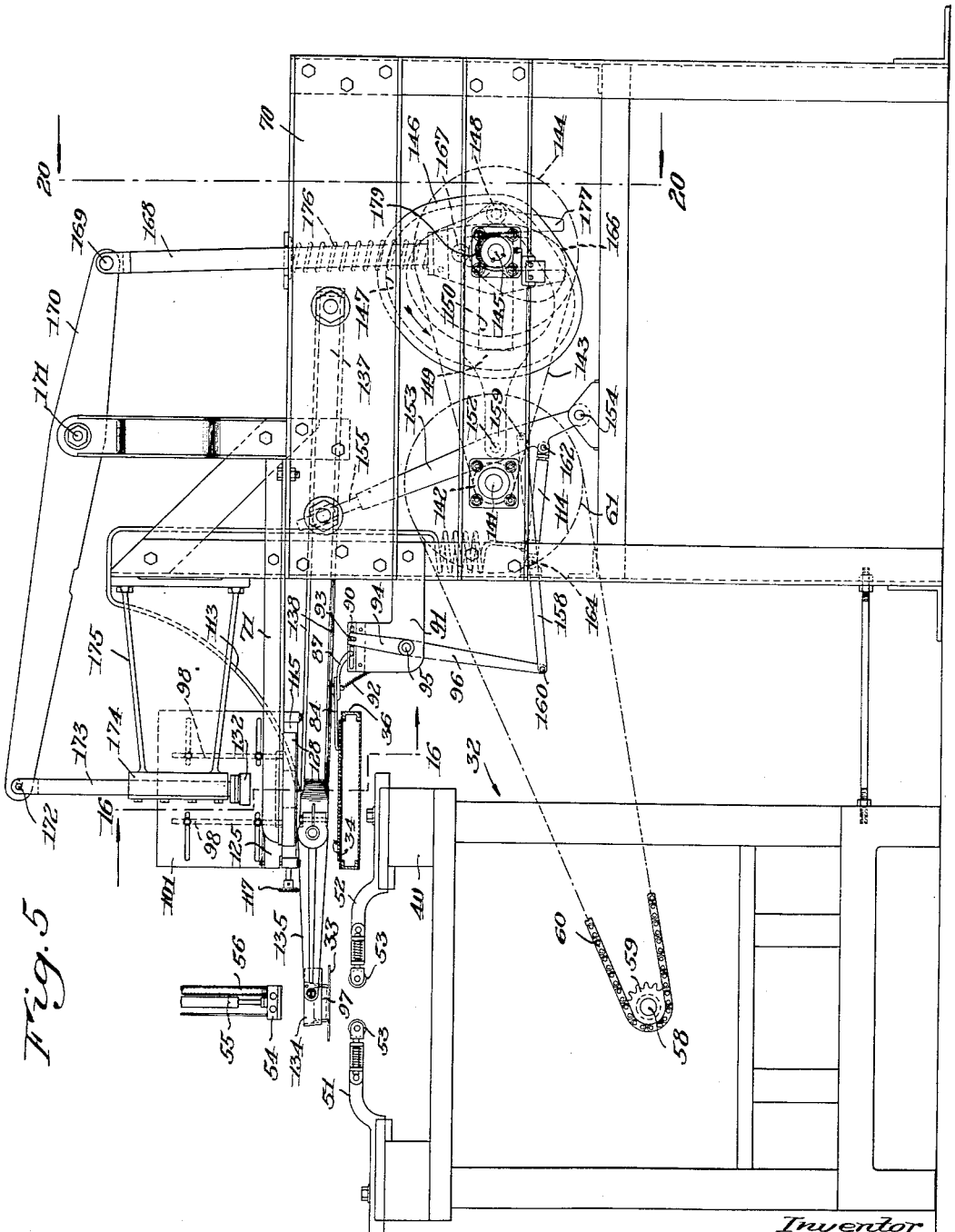

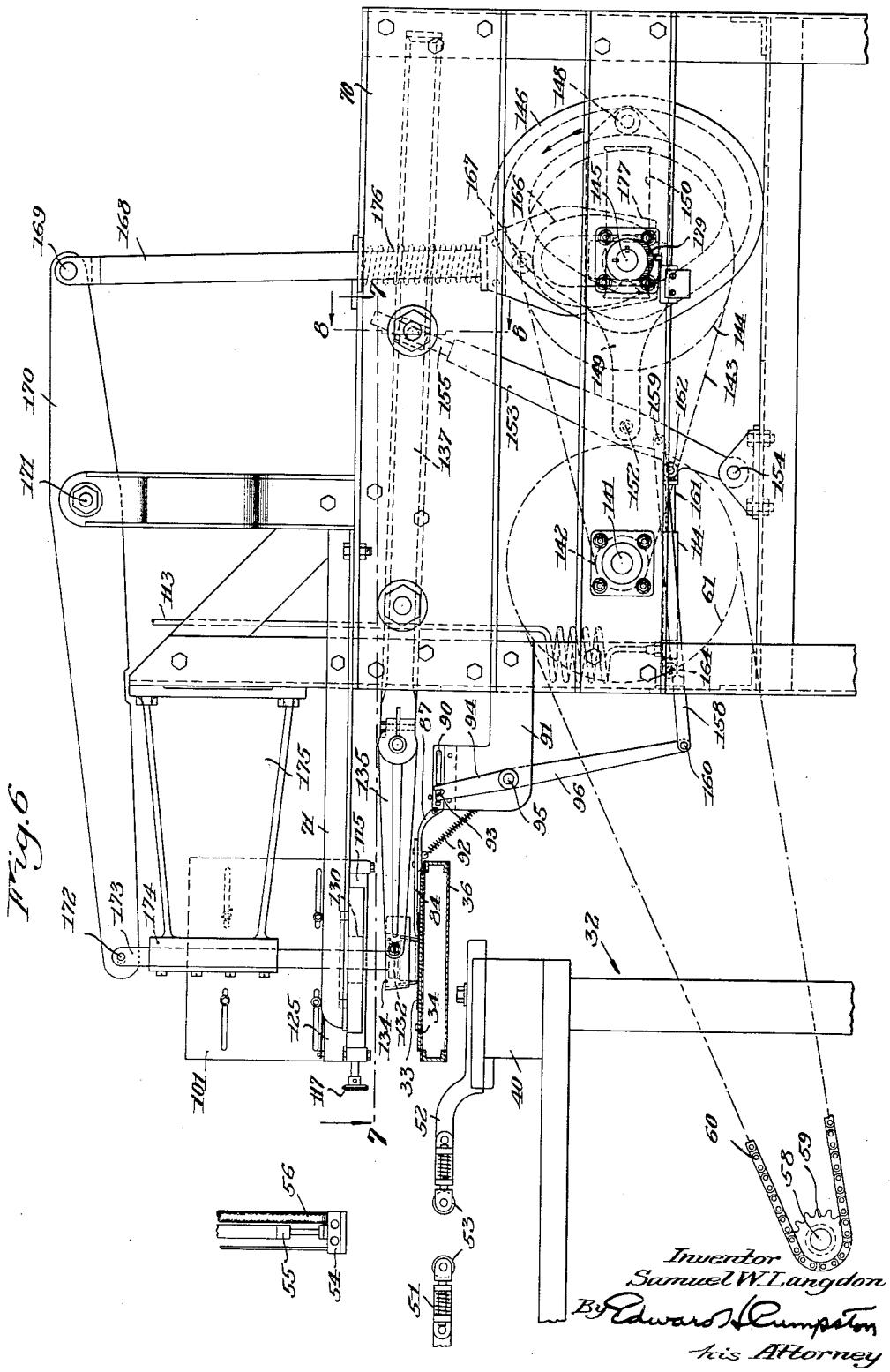

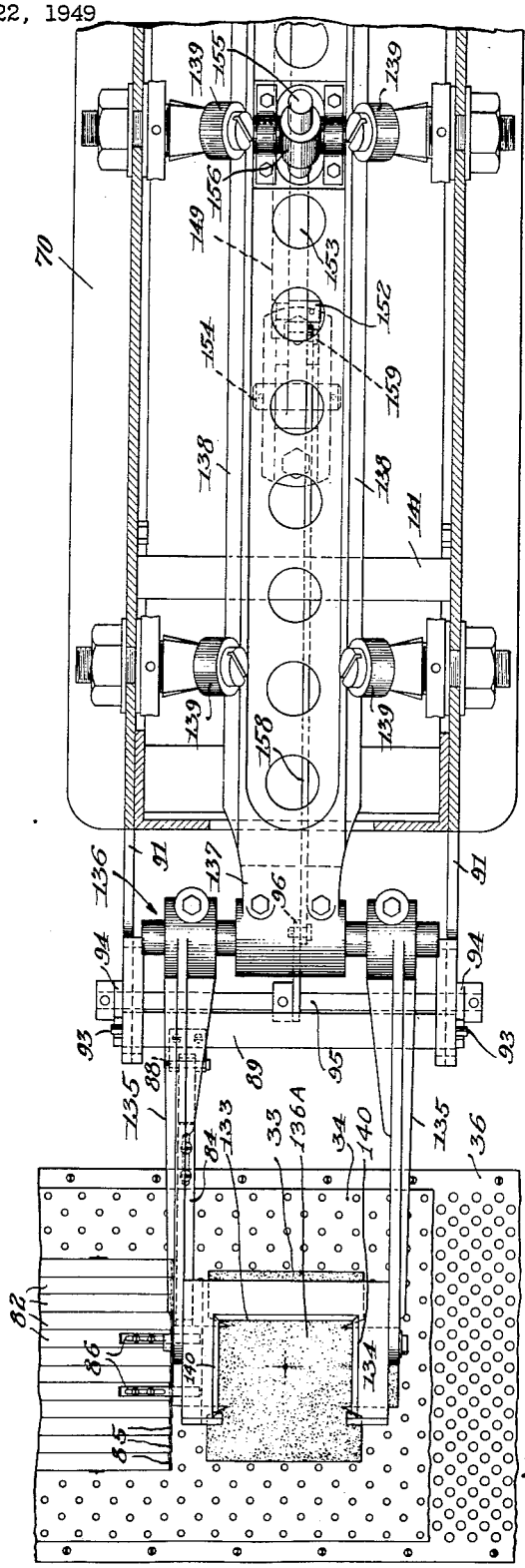

July 19, 1955  S. W. LANGDON  2,713,292
METHOD AND APPARATUS FOR WRAPPING BOXES
Filed Jan. 22, 1949  22 Sheets-Sheet 8
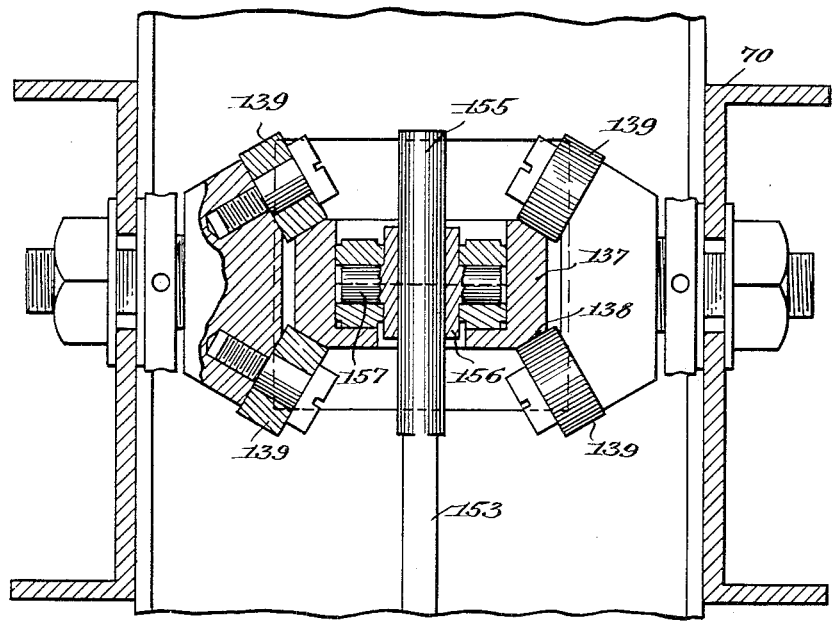
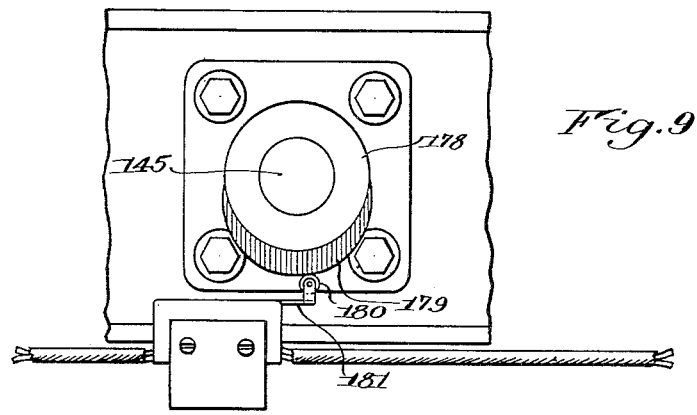
INVENTOR.
Samuel W. Langdon
BY Edward H. Cumpston
his ATTORNEY July 19, 1955 S. W. LANGDON 2,713,292
METHOD AND APPARATUS FOR WRAPPING BOXES
Filed Jan. 22, 1949 22 Sheets-Sheet 9

INVENTOR.
Samuel W. Langdon
By Edward H. Cumpston
his Attorney

July 19, 1955  S. W. LANGDON  2,713,292
METHOD AND APPARATUS FOR WRAPPING BOXES
Filed Jan. 22, 1949  22 Sheets-Sheet 17

INVENTOR.
Samuel W. Langdon
BY Edward H. Cumpston
his ATTORNEY

July 19, 1955 S. W. LANGDON 2,713,292
METHOD AND APPARATUS FOR WRAPPING BOXES
Filed Jan. 22, 1949 22 Sheets-Sheet 18

INVENTOR.
Samuel W. Langdon
BY Edward W. Cumpston
his ATTORNEY

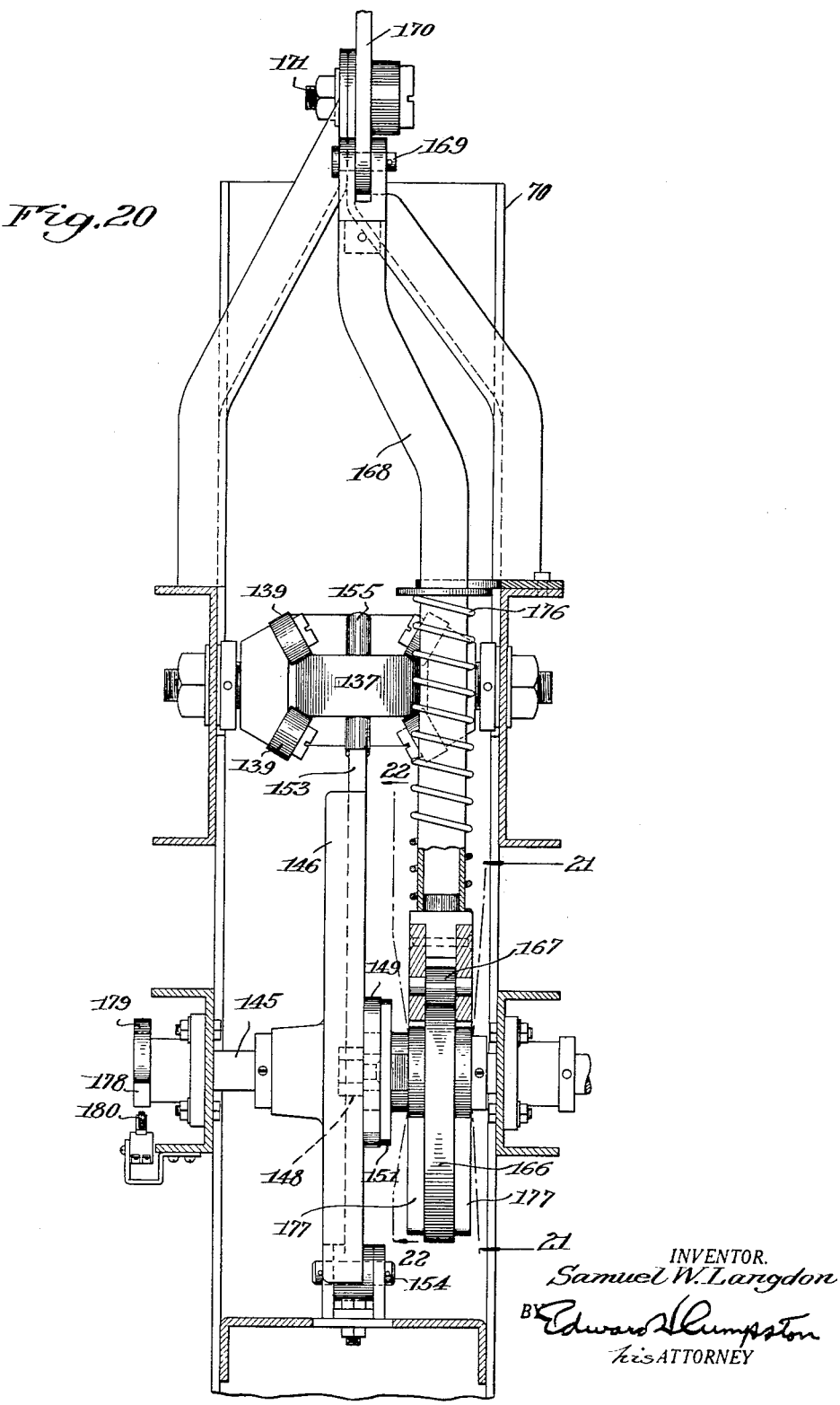

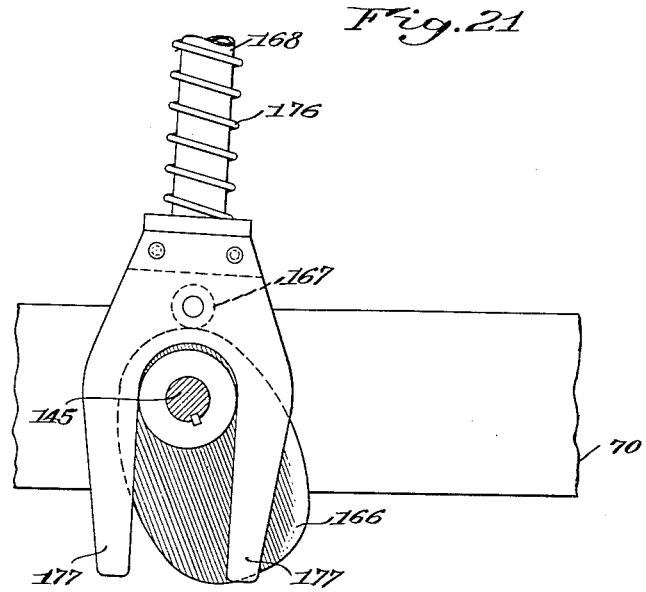
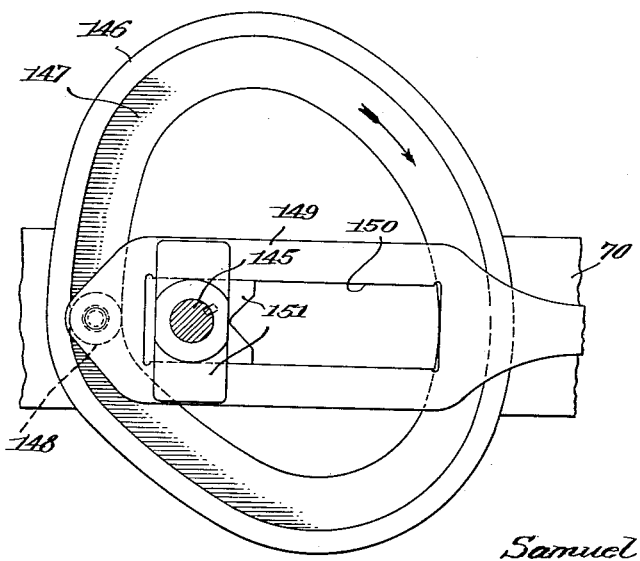

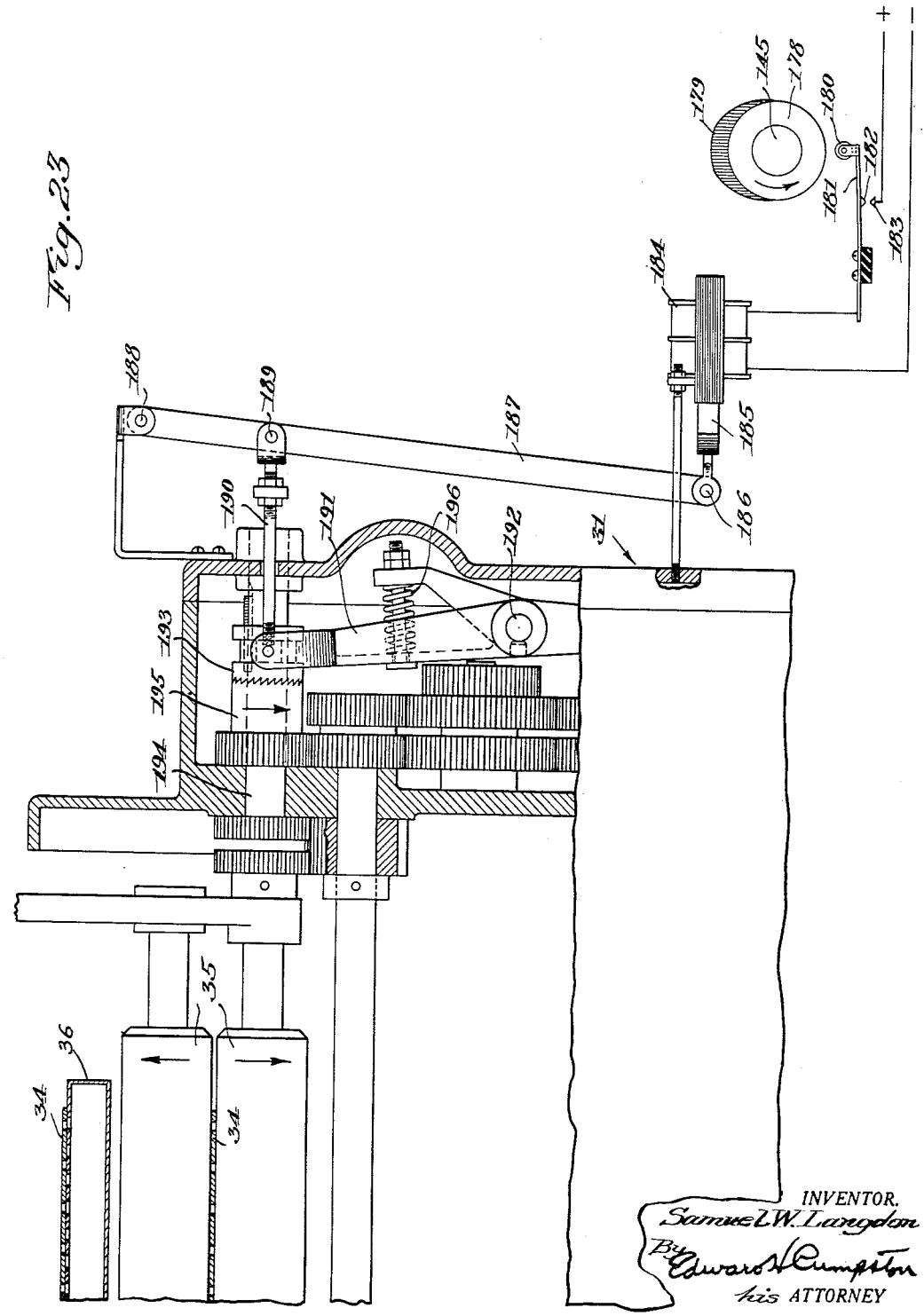

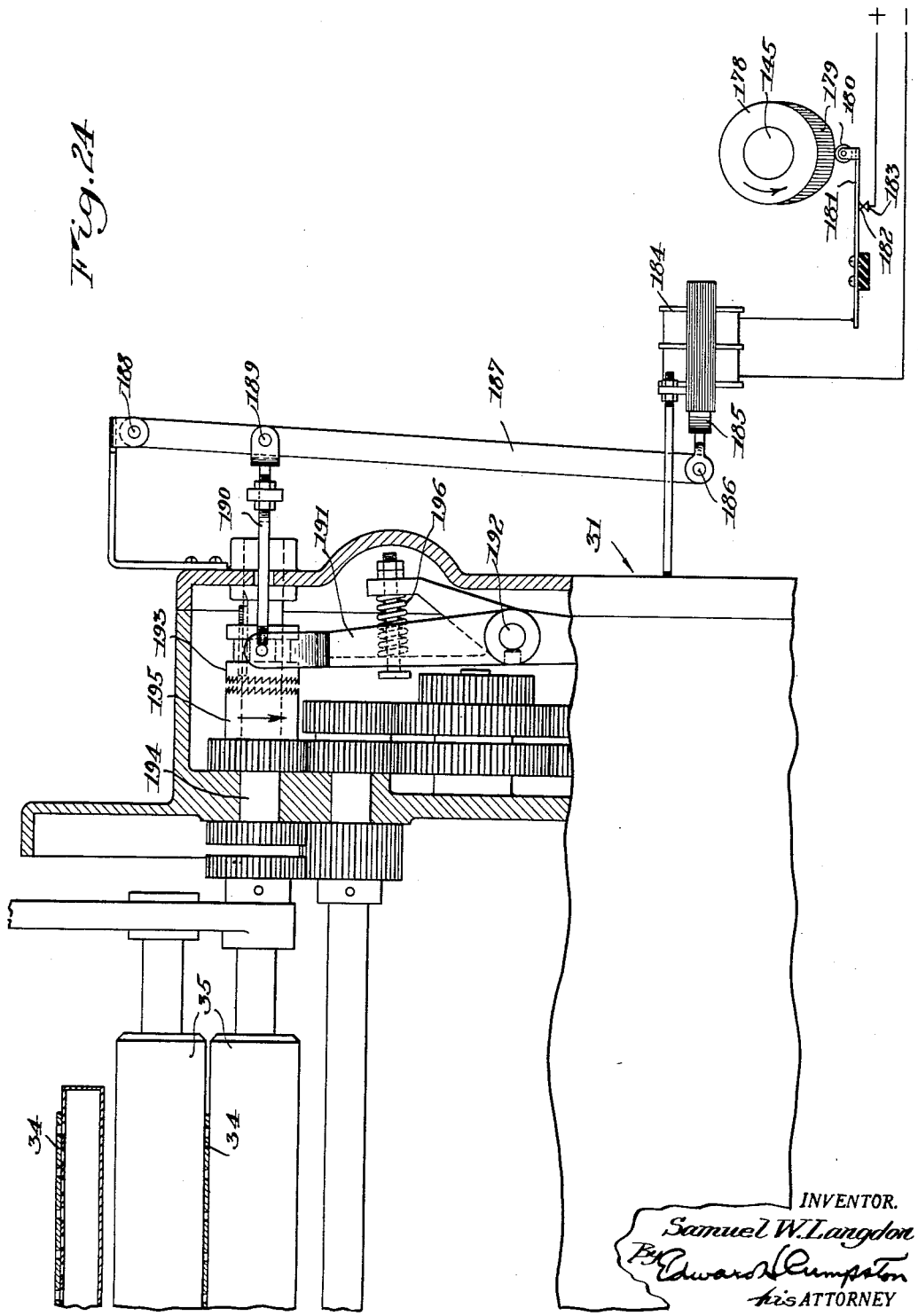

United States Patent Office 2,713,292
Patented July 19, 1955

2,713,292

METHOD AND APPARATUS FOR WRAPPING BOXES

Samuel W. Langdon, Rochester, N. Y., assignor of one-half to Harold J. Nagle and one-half to Reginald Nagle, both of Rochester, N. Y.

Application January 22, 1949, Serial No. 72,218

17 Claims. (Cl. 93—40)

This invention relates to methods and apparatus for wrapping boxes and, more particularly, to the art of feeding and assembling box making elements, such as box blanks and wrappers, and delivery thereof to a wrapping machine, one object of the invention being to provide an improved method and apparatus of this kind of a more simple, practical and efficient nature.

Another object is to provide such a method for feeding and assembling a box blank and wrapper in a more simple, direct and rapid manner.

Another object is to supply an improved method of the above character adapted for registering a glue-coated wrapper with a box blank with a higher degree of precision and in a manner readily applicable to blanks and wrappers of various shapes and sizes.

Another object is the provision of such a method for feeding, bending and registering or "spotting" a box blank on a glue coated wrapper sheet and concomitantly transferring and applying the adhesively associated blank and wrapper directly to the form block of a wrapping machine.

Another object is to provide a method having the above advantages and capable of being carried out by relatively simple, efficient and inexpensive apparatus.

Another object is to supply an improved apparatus capable of carrying out the foregoing method.

A further object is to provide such an apparatus of a more simple nature requiring relatively few parts arranged in a readily accessible manner.

Still a further object is to provide an apparatus of the nature indicated which is adapted for use in gluing and wrapping machines with a few simple modifications.

To these and other ends the invention resides in certain improvements and combinations of parts and method steps, all as will be hereinafter more fully described, the novel features being pointed out in the claims at the end of the specification.

In the drawings:

Fig. 3 is an enlarged side elevation of the parts shown in Fig. 1, partly in section on the line 3—3 in Fig. 1, and partly broken away to more clearly show apparatus embodying the present invention.

Fig. 4 is an enlarged side elevation of the parts shown in Fig. 2 as viewed from the bottom of the sheet;

Fig. 5 is a sectional elevation as seen from the line 5—5 in Fig. 1;

Fig. 6 is a view similar to Fig. 5 with the parts in a different operating position;

Fig. 7 is an enlarged, sectional plan view on the line 7—7 in Fig. 6;

Fig. 8 is a sectional elevation on the line 8—8 in Fig. 6;

Fig. 9 is a fragmentary enlarged view of parts shown in Fig. 6;

Figs. 16 to 19, inclusive, are enlarged, sectional elevations substantially on the line 16—16 in Fig. 5 and showing the blank and wrapper assembling parts in successive positions;

Fig. 20 is an enlarged, sectional elevation substantially on the line 20—20 in Fig. 5;

Fig. 21 is an enlarged, fragmentary sectional elevation substantially on the line 21—21 in Fig. 20;

Fig. 22 is an enlarged, sectional elevation on the line 22—22 in Fig. 20, and

Figure 2:
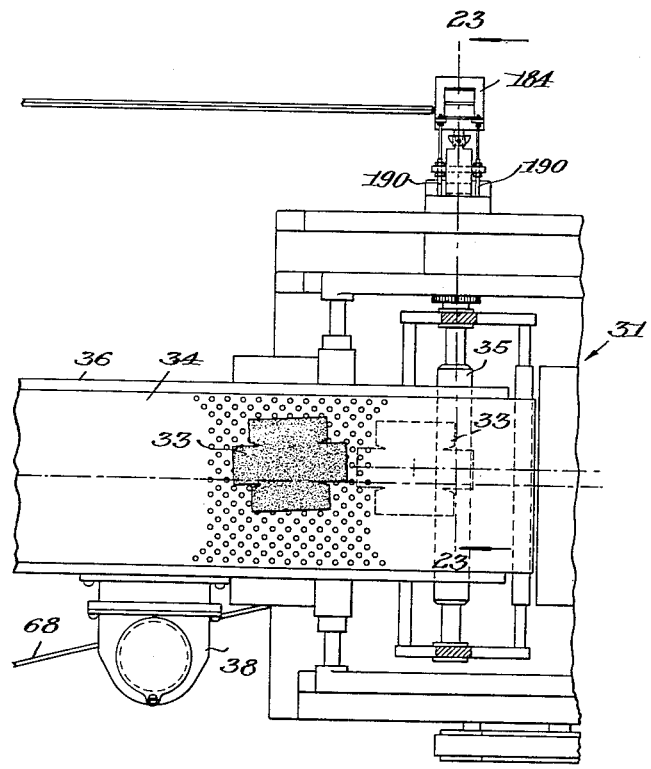
Fig. 2 is a similar view showing the gluing and conveying mechanism.

Figs. 23 and 24 are enlarged, sectional elevations substantially on the line 23—23 in Fig. 2.

The method of my invention is best disclosed in connection with a description of a preferred apparatus for carrying it out. Such apparatus is employed in combination with a gluing machine of any known and suitable construction such, for example, as disclosed in Bailey Patent No. 2,399,616 and shown generally in present Figs. 2 and 4, for supplying glue-coated wrappers. It is employed in combination also with a wrapping machine, shown in part in present Figs. 1, 3 and 5, and more particularly in my copending application, Serial No. 72,217, filed January 22, 1949, now U. S. Patent 2,604,828 for Box Making Machine, to which reference may be had for a more complete description, the blanks and wrappers adhesively assembled as hereinafter described being automatically transferred to such a machine for completing the folding and wrapping of the box.

Figure 16:
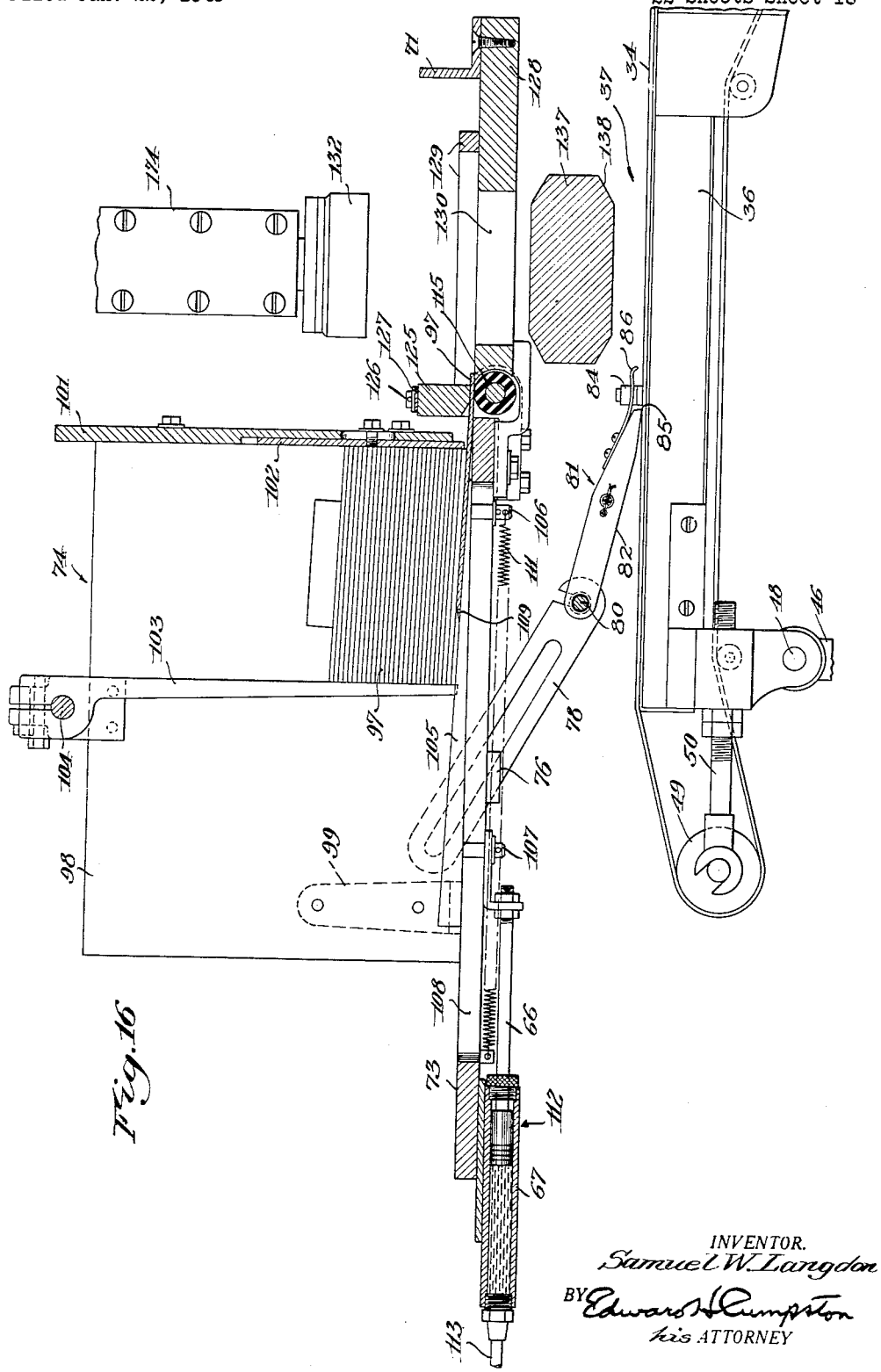
Figure 17:
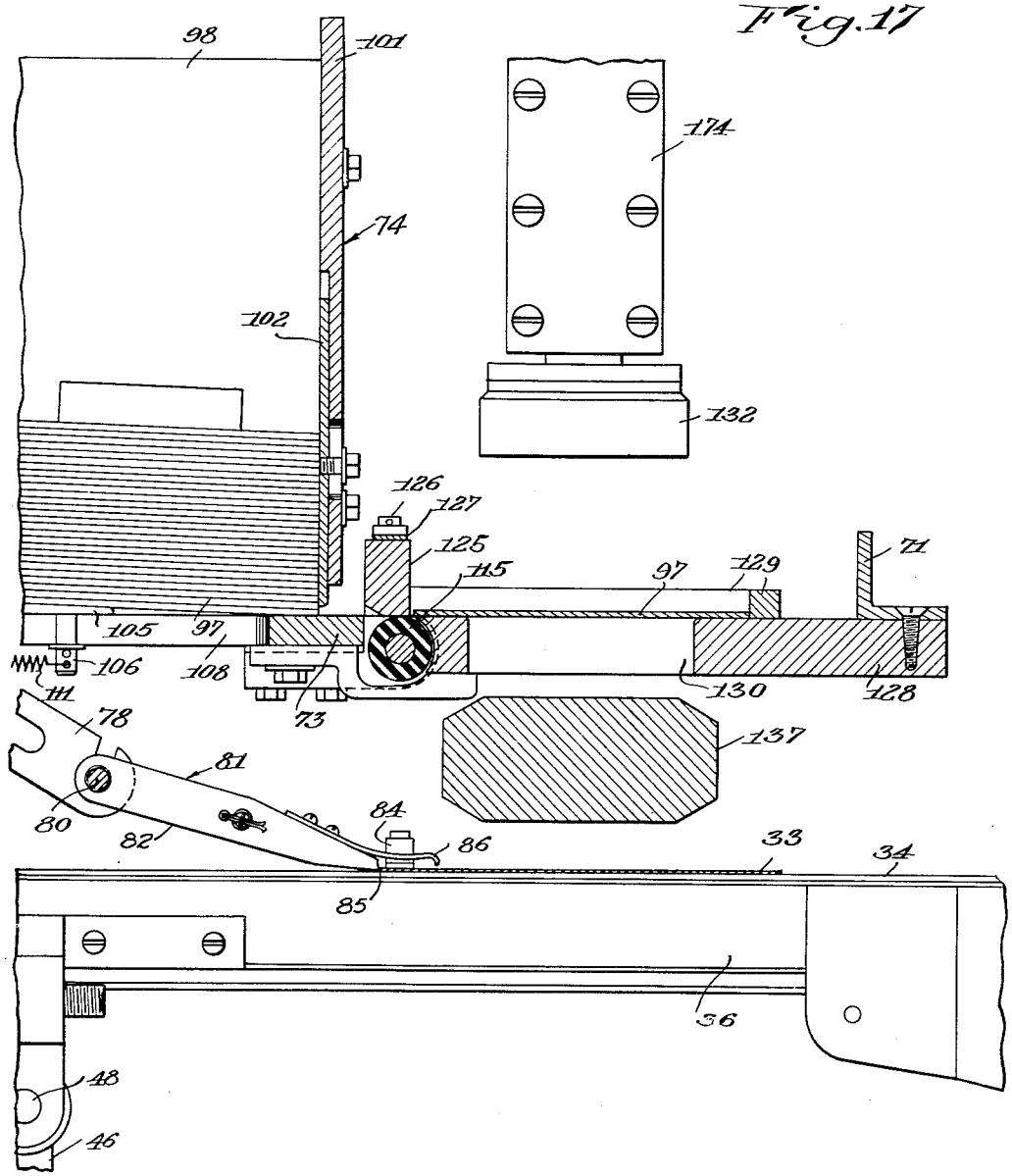
Figure 19:
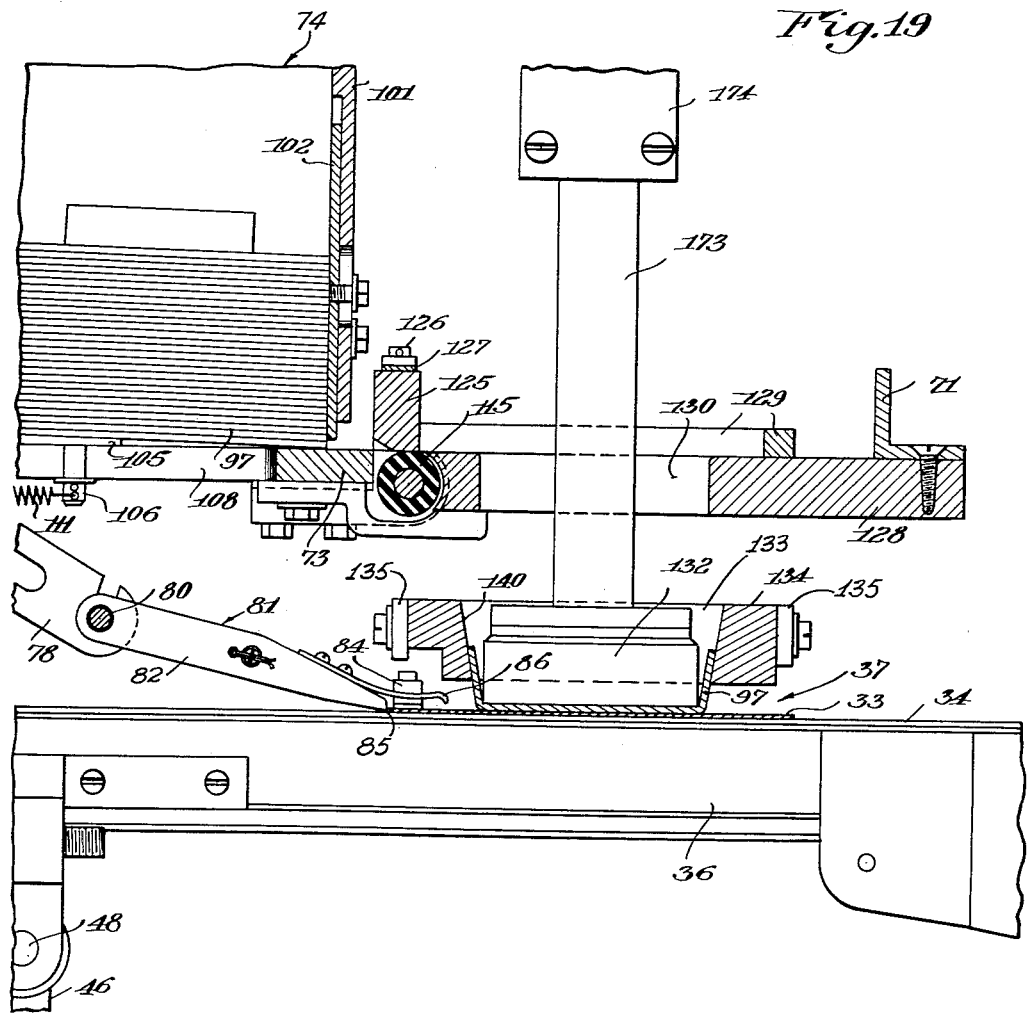

The coated wrappers 33 are fed by the gluing machine to an endless flexible member or belt 34 of foraminous or perforated construction which is driven by a pair of rolls 35 (Figs. 2 and 23) of the gluing machine so that its upper run is supported by and closes the open upper side of a suction box 36 as the belt travels toward an assembly station indicated generally at 37 (Figs. 16 and 19). The suction box is exhausted by a conduit 38 connected therewith and with a pump or blower 39 driven by any suitable means. The belt and suction box extend beyond the assembly station where the suction box is supported on the top of the frame 40 of the wrapping machine. To this end, the frame supports a pair of arms, 41 and 42, supported by studs as shown for pivotal, horizontal adjustment and carrying vertically adjustable rods, 43 and 44, on the upper ends of which are bearing heads, 45 and 46, for rods 47 and 48 fixed to the under side of the suction box, thus adjustable supporting it on the wrapping machine frame. The belt passes around a roller 49 rotatably supported by bracket arms, 50, on the end of the suction box, and it will be seen from this construction that the belt passes from the gluing machine past the assembly station of the mechanism, through which distance it is subjected to suction to hold the wrapper in flat condition thereon.

The wrapping machine is generally of the construction disclosed in Smith Patent No. 691,329 and the patent to Reifsnyder et al. No. 1,131,792, but comprises in the present instance a pair of bracket arms, 51 and 52 (Figs. 1 and 5), projecting toward each other from opposite sides of the frame and equipped with spaced side rollers, as 53, for folding a box and wrapper carried therebetween on a form block 54 on a vertically reciprocating plunger 55, as well understood in the art. The form block is preferably chambered with laterally opening ports and provided with a conduit 56 for applying suction thereto for gripping and holding the blank as indicated in Fig. 5. The wrapping machine is driven by any suitable means such as a pulley 57 on a shaft 58 (Figs. 1 and 3), driving a sprocket wheel 59 from which a sprocket chain 60 leads to and drives a sprocket wheel 61 of the assembly mechanism, as hereafter described. Shaft 58 drives a worm 62 meshing with a gear 63 on a shaft 64 carrying an arm 65 arranged to strike a roller 66 on an arm 67 which operates a rod 68 connected to an arm 69 associated with the usual handle 69a on a shaft 69b of the gluing machine, to effect a one-cycle operation thereof in timed coordination with each operation of the wrapping machine, substantially as disclosed in Stokes Patent No. 2,152,775 and in Federwitz Patent No. 1,906,051 and well understood in the art.

Figure 11:
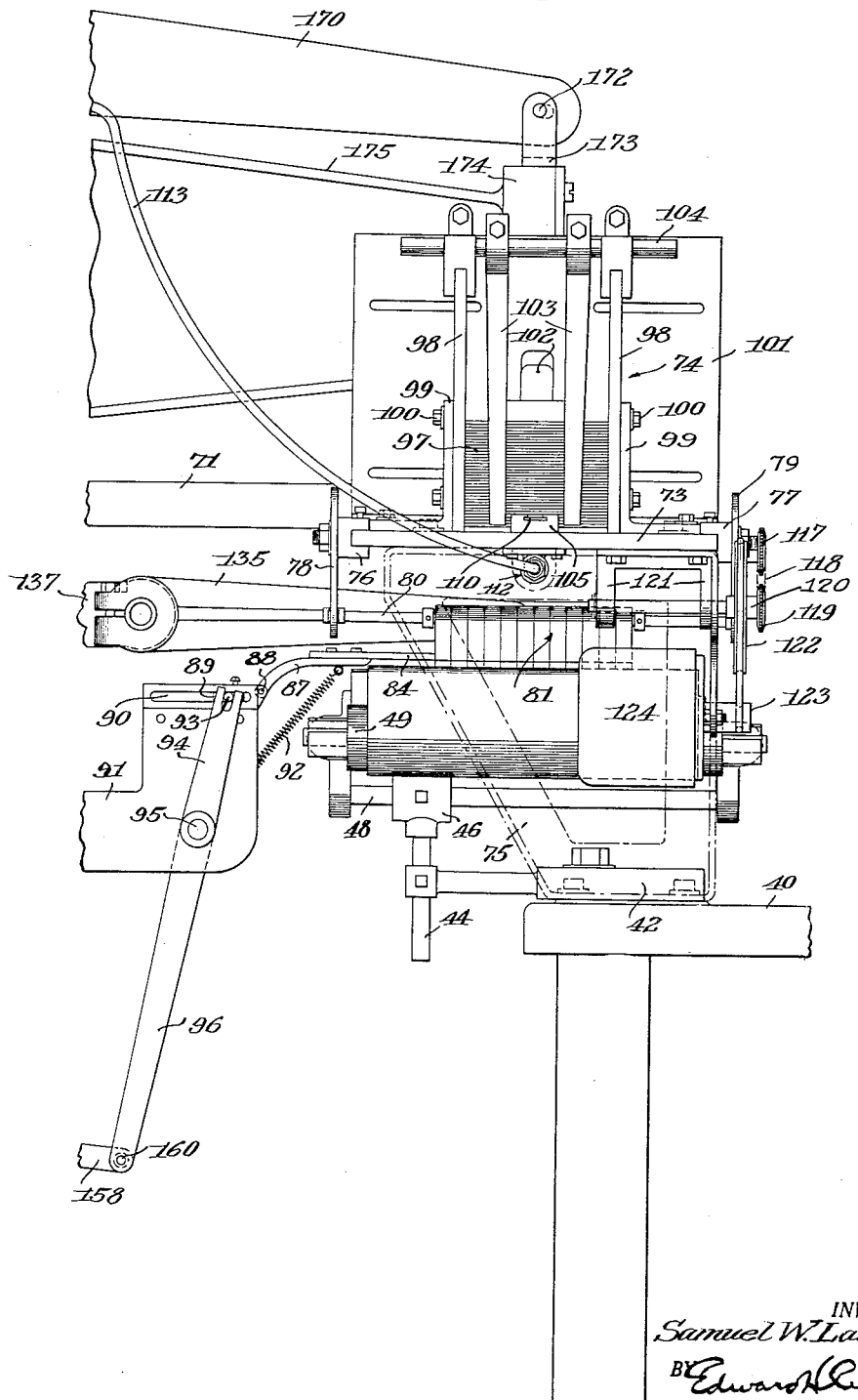
Fig. 11 is a similar view of other parts.
Figure 14:
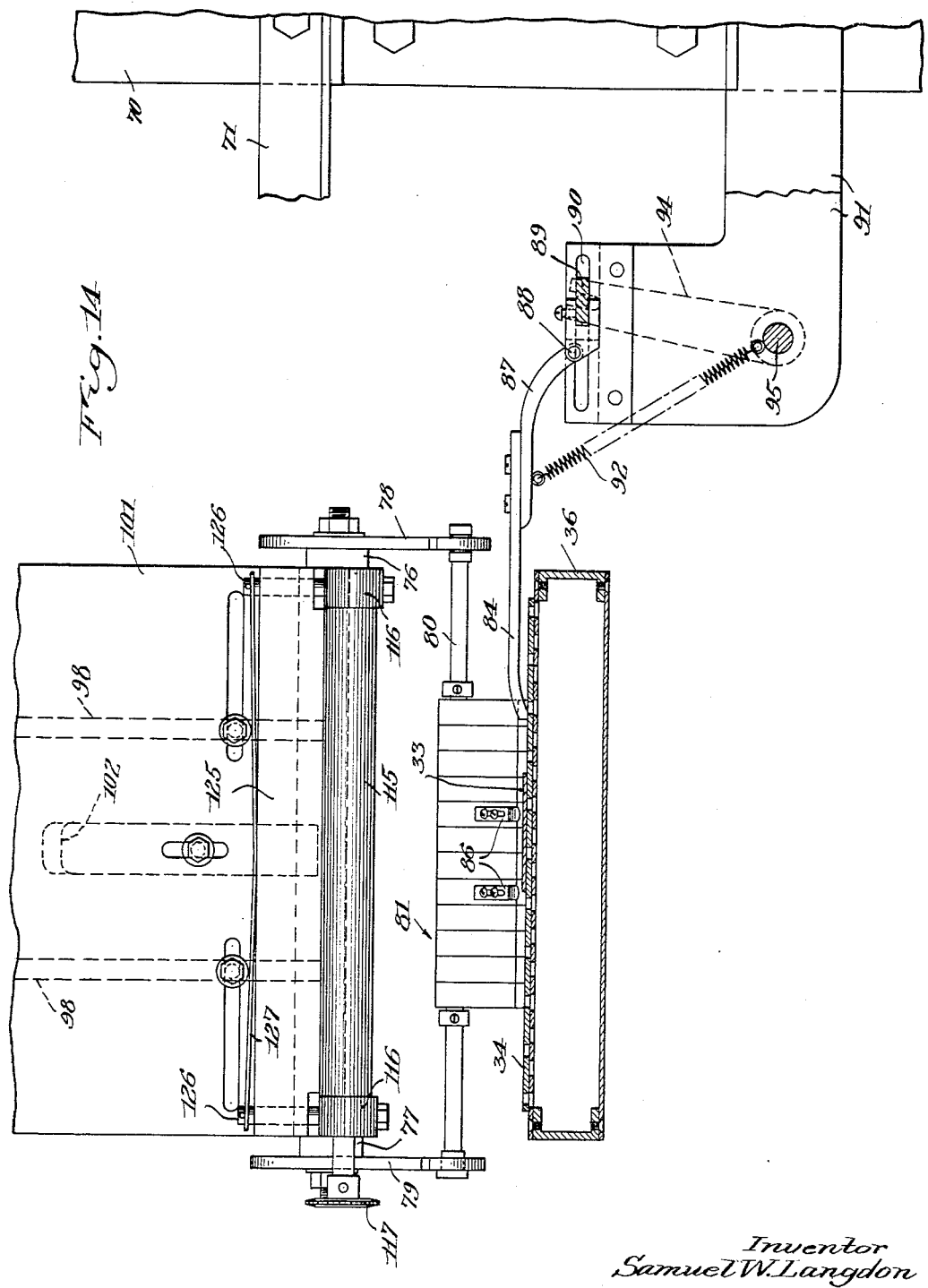
Fig. 14 is a sectional elevation on the line 14—14 in Fig. 12.

The present apparatus for feeding and assembling the box elements is mounted on a structural frame indicated generally at 70 (Fig. 1) having angle bars 71 and 72 extending toward the assembly station and fixed to and supporting a bed or plate 73 (Figs. 1, 11 and 15), carrying a box blank hopper indicated generally at 74 and hereafter more fully described. This plate is also connected to and supported by the frame of the wrapping machine, as by means of an angular bracket 75 (Fig. 11). Clamped to opposite edges of the plate are brackets 76 and 77 (Figs. 11, 14 and 15), on which are adjustably mounted a pair of side arms 78 and 79, connected at their lower ends by a spindle 80 forming part of an articulated stop means indicated generally at 81 and which will now be described.

This stop means comprises a series of fingers 82 each pivotally supported at one end on spindle 80 and having its other free end resting on and supported by the wrapper feeding belt 34. These fingers are arranged in juxtaposed, parallel relation with one another and a coiled tension spring 83 is passed through aligned openings in the fingers with its ends anchored to the outermost ones, to hold them together and provide a yieldable resilient connection therebetween, so that each finger is free to rest in contact with the belt and follow any irregular elevation of its surface, thus maintaining contact between each of the fingers and the belt. The free end or extremity of each finger is preferably inclined transversely of the belt and toward and along the path of movement of a positioning finger 84 hereafter more fully described. These ends of fingers 82 thus present a series of points 85 spaced along a line extending transversely of the belt to engage and move a wrapper while being fed by the belt, so as to align the wrapper and position it in the direction of movement or path of the belt. Two spaced fingers are preferably provided with metal leaf extensions 86, to hold the wrapper down on the belt in case it should tend to buckle on engagement with the stop fingers. The above stop means serves to align a wrapper which may lie on the belt at an angle to its path of movement and also to stop and register the wrapper in the same direction with the assembly station.

Figure 12:
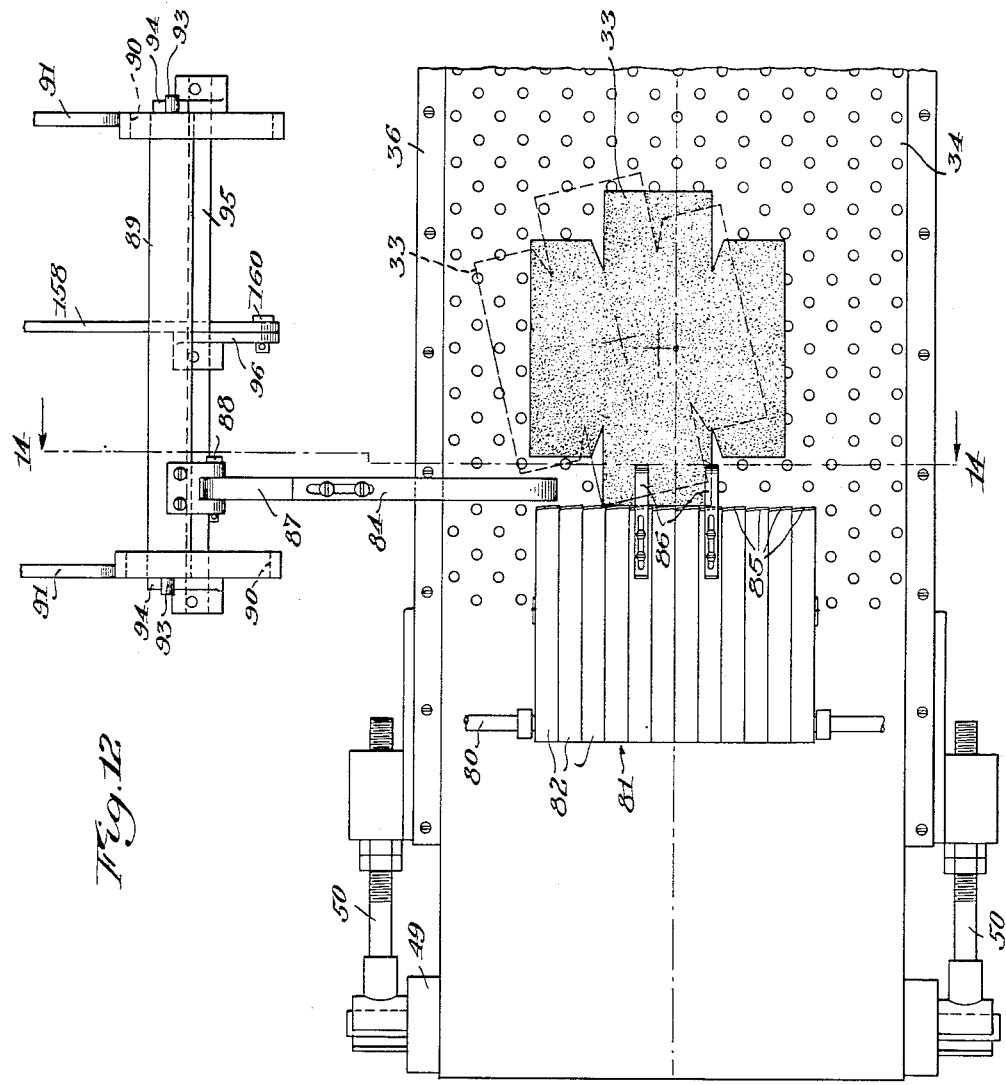
Fig. 12 is a top plan view of means for registering a wrapper with the blank applying means.
Figure 13:
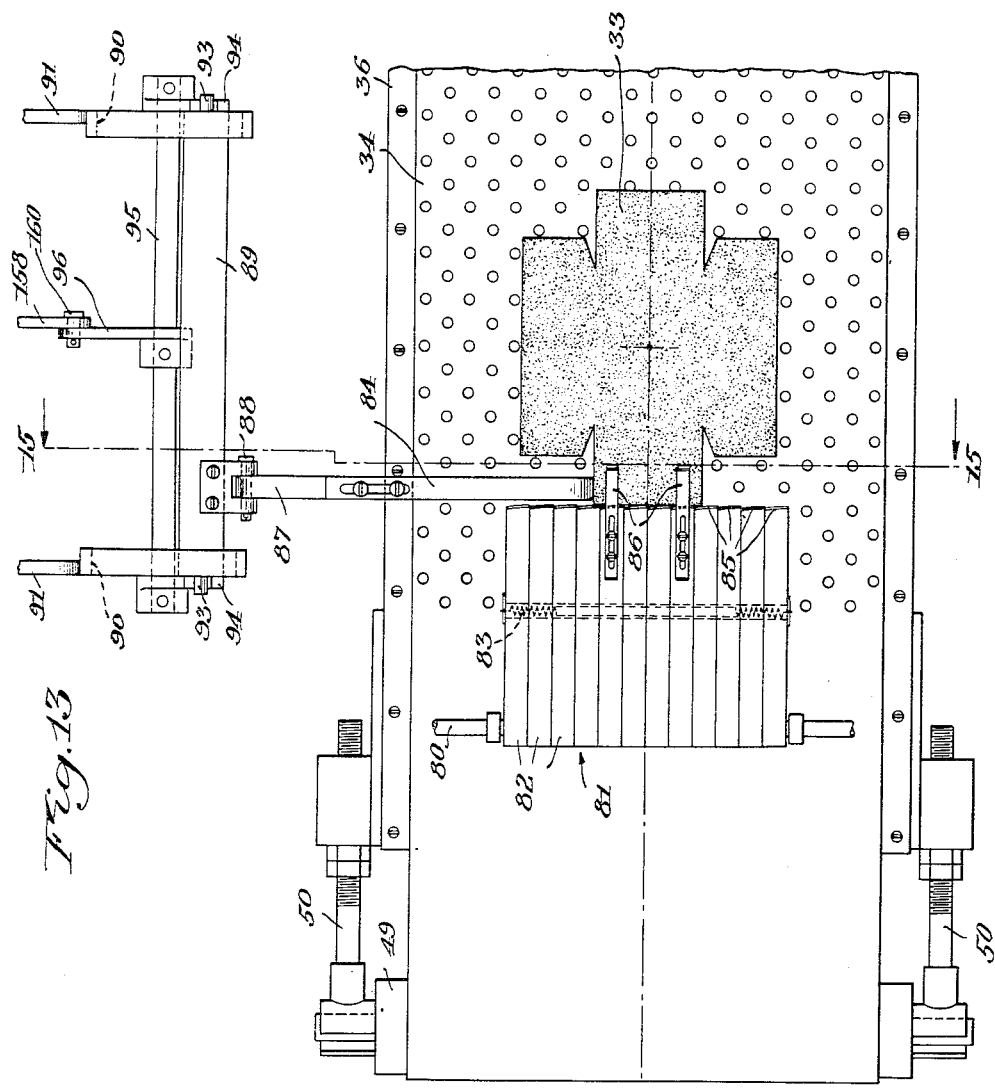
Fig. 13 is a similar view, but showing the parts in a different position.

Means are provided to effect the registry of a wrapper in the other direction transversely of the belt comprising, preferably, the metal finger 84 (Figs. 12 to 15, inclusive) adjustably connected with an arm 87 pivoted at 88 to a bracket on a bar 89 slidably mounted at its ends in slots 90 in spaced bracket arms 91 projecting from the frame. A coiled tension spring 92 maintains the free end of the finger 84 in contact with the surface of the belt to engage and move a wrapper as bar 89 is reciprocated. The ends of the bar have projecting pins 93 (Figs. 12 and 13) engaged in notches in the ends of a pair of arms 94 fixed on a shaft 95 mounted to rock in the brackets 91.

Fixed to shaft 95 also is a depending rock arm 96 (Fig. 5) provided with means hereafter described to effect the rocking movement thereof and of the shaft.

The wrappers are delivered by the gluing machine to the belt so as to pass intermediate the finger 84 and the position of registry at the assembly station so that, after a wrapper has been aligned and positioned by the stop means, it is engaged and moved a short distance by the finger 84 to bring it into full registry with the assembly station where a box blank is fed and applied in registered, adhesive contact therewith, as hereafter described.

Figure 1:
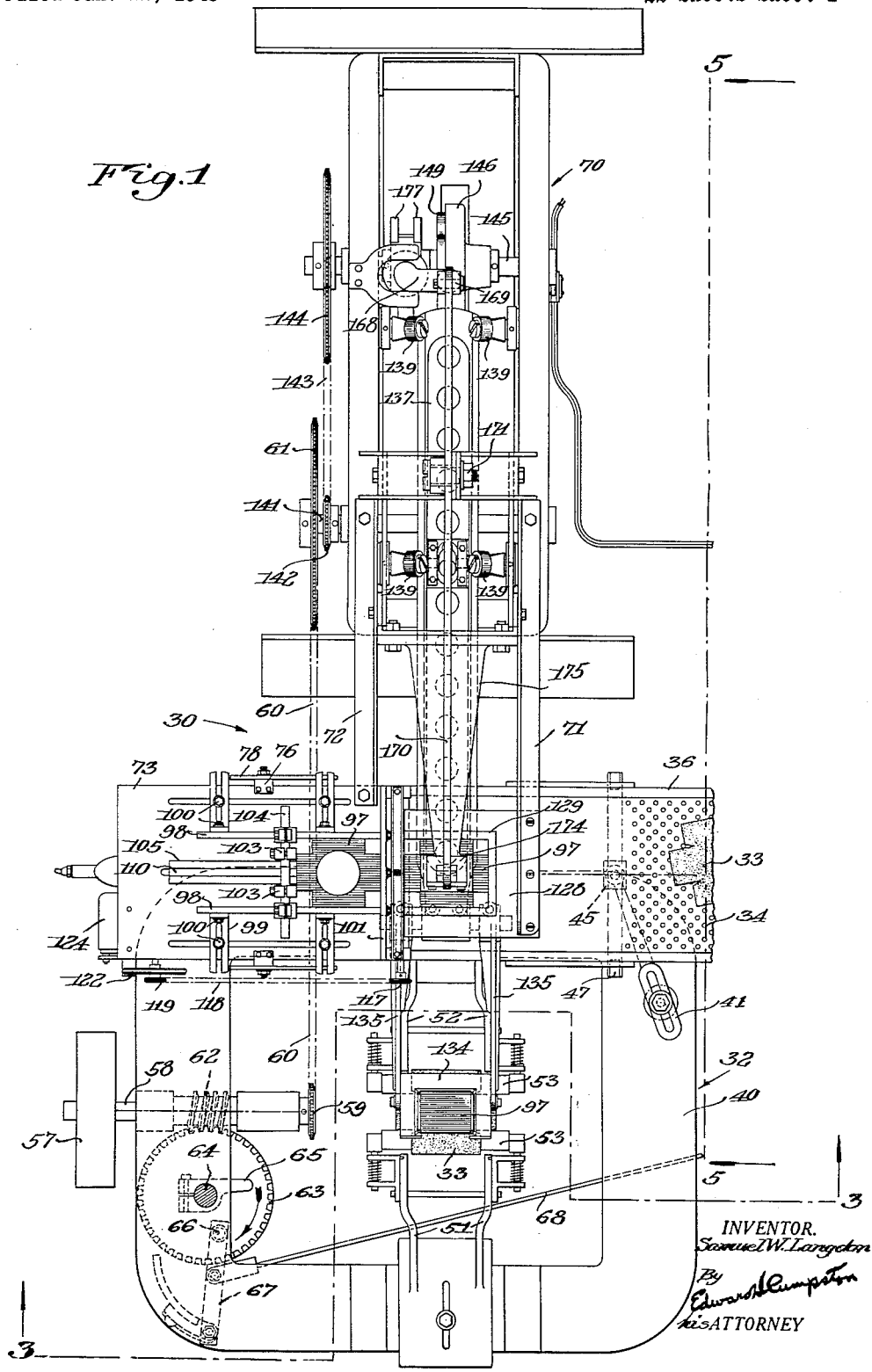
Fig. 1 is a top plan view of one portion of an apparatus for carrying out and embodying the present invention and showing the same broken away from its associated gluing mechanism.
Figure 15:
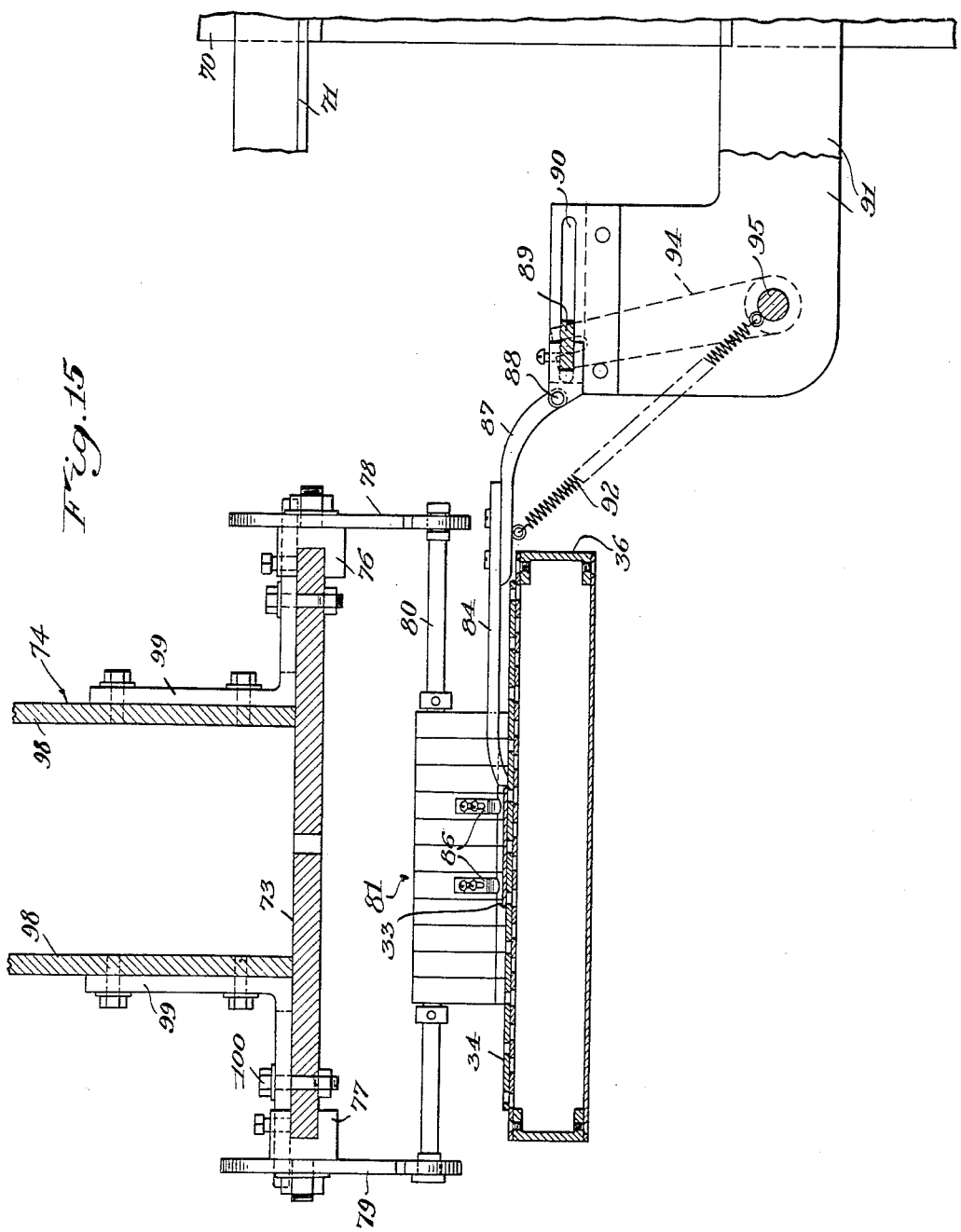
Fig. 15 is a sectional elevation on the line 15—15 in Fig. 13.

The box blanks 97 are stacked in the hopper 74 (Figs. 11 and 16) comprising spaced side plates 98 carried by brackets 99 adjustably secured to the plate 73 as by means of bolts 100 (Figs. 1, 11 and 15). The delivery end of the hopper is formed by a plate 101 adjustably bolted to the side plates and carrying an adjustable gate 102 (Fig. 16) adapted to have its lower end spaced at such a distance above the bed plate as to permit the passage of only one blank at a time. The rear side of the hopper is formed by a pair of spaced arms 103 depending from a spindle 104 mounted in brackets on top of the side plates 98. By such mounting, the arms may be given a slight forward inclination to assist in the feeding of the blanks toward the gate.

The means for feeding the blanks comprises a bar 105 (Figs. 11 and 16) having a downwardly and forwardly inclined upper surface on which the stack of blanks is supported. The bar is guided for movement by spaced studs 106 and 107 depending therefrom through a slot 108 in the plate 73 and a projecting spur or picker 109 is secured in a slot 110 in bar 105 (Fig. 11), for engaging the rear edge of the bottom blank to eject it forwardly from the hopper during forward movement of the bar. A coiled tension spring 111, attached to stud 106 and the plate 73, tends to retract the bar, while a hydraulic piston and cylinder device 112 has its piston rod 66 connected with the stud 107 to move the bar forwardly to eject the blank. This hydraulic device is operated by fluid pressure in a conduit 113 (Fig. 10) leading from the cylinder 67 to a master cylinder 114 of a pulsator system operated by means hereafter described. As the bar 105 is moved forwardly to eject a blank as described, its inclined shape serves to slightly shake the stack of blanks to keep them disengaged and free and also shifts and points the lower blank toward the delivery gate.

The blank feeding means comprises also a roller 115 (Fig. 16) for engaging a blank ejected from the hopper and advancing it to the assembly station 37. Roller 115 is rotatably supported at its ends in bearings 116 (Fig. 14) on plate 73, with its top substantially tangent to the plane of the upper face of the plate, as shown. One of the trunnions of the roller is extended and carries a sprocket wheel 117 rotated by a chain 118 passing around a sprocket 119 on a shaft 120 rotatably supported in bearings 121 on the plate 73. Shaft 120 has fixed thereon a pulley 122 belted to a pulley 123 on an electric motor 124 also supported by a bracket depending from the plate. By this means the feed roller 115 is continuously rotated and the blank is moved into engagement with it by a presser bar 125 (Fig. 16) having its end slidably mounted on posts 126 on plate 73, as by means of openings receiving the posts or in any other known and suitable manner the particular details of which form no part of the present invention. A leaf spring 127, fixed at its ends on the posts, has its central portion bowed downwardly to yieldably press the bar toward the roller to press the blank into feeding engagement therewith, as shown in Fig. 16.

Figure 18:
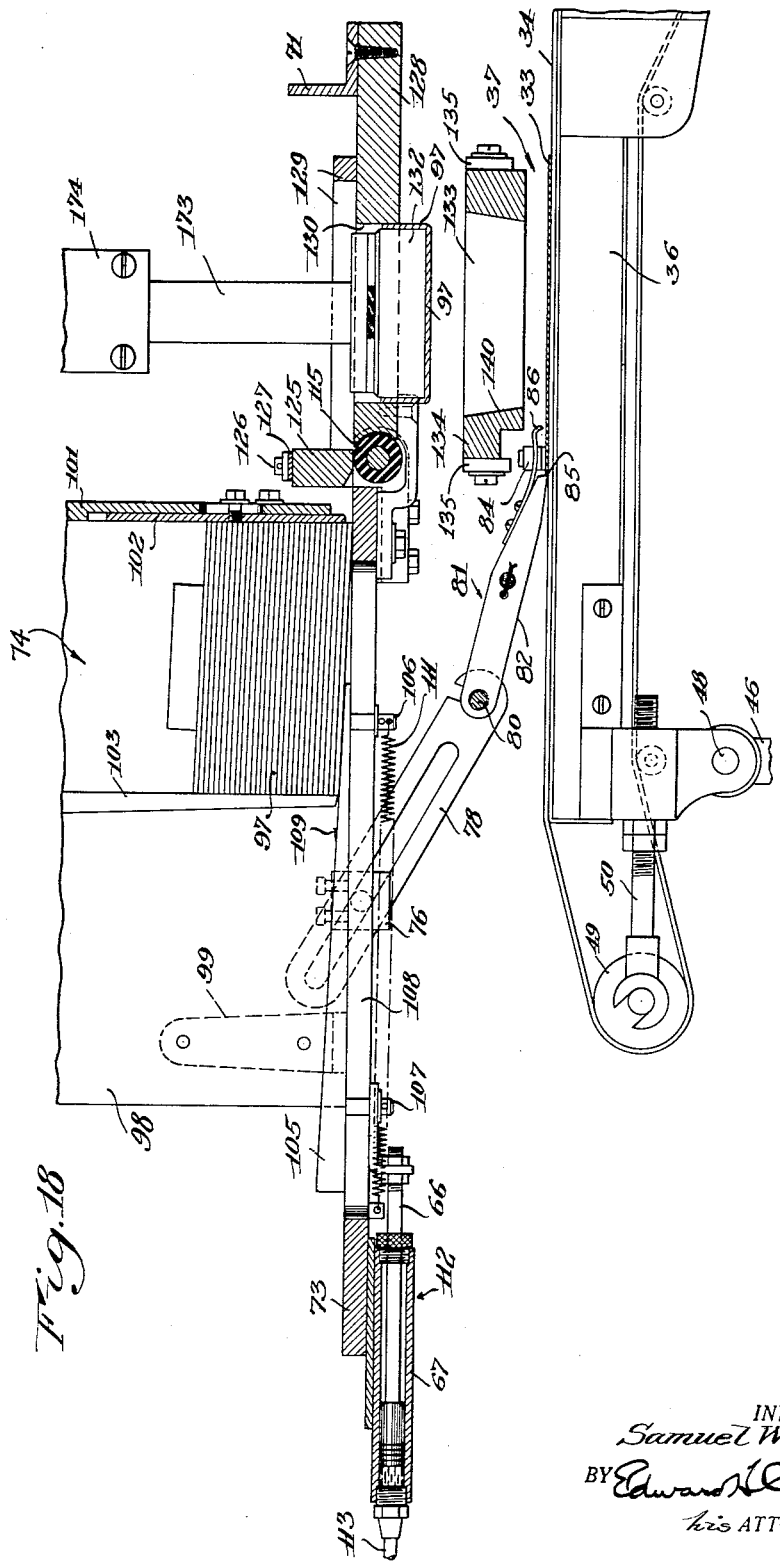

A blank 97 fed by such roller means is discharged onto a stationary part or plate 128 (Fig. 17) fixed to plate 73 and having its upper surface substantially level with the top of the roller. Part 128 carries stop means or gauge bars 129 by which the blank is stopped and positioned in registry above an opening 130 in part 128 of substantially the same size and shape as the central panel of the blank. A blank panel is thus registered with the opening and with the assembly station below which the wrapper has been registered as described above. With the blank in this position a form block 132 is brought down by plunger means hereafter described to carry the blank through the opening 130 the sides of which fold the marginal flaps or wings of the blank upwardly as it is moved through the opening by the form block, as shown in Fig. 18. The blank is preferably scored and its marginal flaps or wings may be previously bent or "broken" along such score lines, if desired, to facilitate the bending, depending upon its size, shape and material, as well understood in the art.

The further descent of the form block 132 carries the blank through an opening 133 in a collar or frame 134 carried between the spaced arms 135 of a fork 136 (Fig. 7) projecting from one end of a slide 137. The slide has pairs of opposed guide surfaces, as 138, on its opposite sides (Figs. 7 and 8), supported by pairs of rollers 139 mounted on trunnions on the spaced side walls of the frame, as shown. The slide is reciprocated by means hereafter described to move its frame 134 from a position of registry with the assembly station as shown in Fig. 7 into registry with the form block of the wrapping machine to transfer to the latter the blank and wrapper after assembly as hereafter described.

The opening 133 of the fork frame 134 is preferably formed of substantially the same shape in outline as the central panel of the blank, except for a gap 136a in its forward side (Fig. 7) but has its side walls 140 tapered downwardly and inwardly to a minimum size at the lower face of the frame somewhat larger than the side of the center panel of the blank. The outwardly flared upper end of the opening in the frame readily receives the form block and blank as they descend, the block carrying the blank through the opening, as shown in Fig. 19, to register the panel of the blank with the adhesive coated wrapper in registry below it. On the upward or return movement of the block the assembly thus made is held on the belt with the upwardly folded flaps of the blank frictionally engaged in the opening 133 of the fork, as shown, and the fork is then reciprocated, as hereafter described, to transfer the assembly from the position shown in Fig. 6, into registry with the plunger means and form block of the wrapping machine, as shown in Fig. 5, so that on descent of the form block of the wrapping machine, the assembly is carried into the latter to complete the folding and wrapping of the block while the fork 136 is retracted to receive the next assembly and repeat the cycle.

Figure 10:
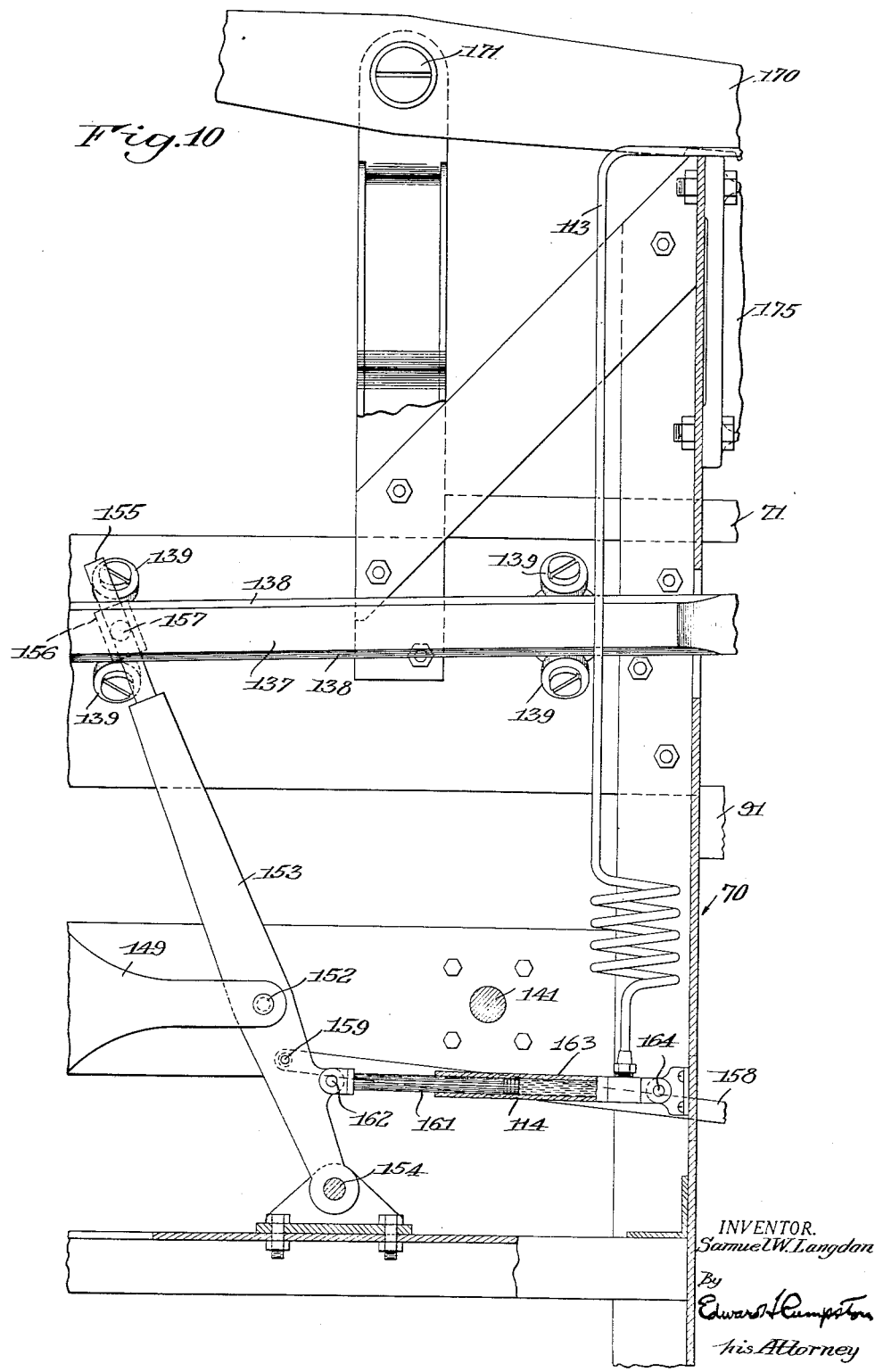
Fig. 10 is an enlarged elevation of parts of the machine as viewed from the left in Fig. 1, partly in section and partly broken away.

The mechanism for actuating the moving parts comprises the sprocket wheel 61 connected with the driving mechanism of the wrapping machine as described above. This sprocket wheel is fixed on a shaft 141 (Figs. 1 and 3) rotating in suitable bearings on the main frame and having fixed thereon also a smaller sprocket wheel 142 connected by a chain 143 with a sprocket wheel 144 on a shaft 145 rotating in suitable bearings on the frame. Fixed on this shaft is a cam 146 (Figs. 20 and 22) having an internal groove 147 in which is engaged a follower or roller 148 on a connecting rod 149 formed with a longitudinal guideway 150. This guideway slidably embraces a guide block 151 rotatably mounted on shaft 145. It will be apparent from this construction that rotation of the shaft and its cam acts to reciprocate the connecting rod 149 which has its other end pivoted at 152 to a lever 153 having its lower end pivoted at 154 on the frame (Fig. 10). The upper end 155 of the lever is of cylindrical shape and slides longitudinally in a bearing 156 (Figs. 7 and 8) having oppositely extending trunnions 157 mounted to rock in bearings on the slide 137 of the transfer fork 136, so that as lever 153 is rocked about its lower end, its upper end reciprocates the fork to feed the box blanks as described above.

The means for reciprocating the finger device 84 comprises a link 158 (Figs. 5 and 6) having one end pivoted at 159 to the lever 153 and its other end pivoted at 160 to the rock arm 96, which reciprocates the finger to register the wrappers as described above.

The means for operating the master cylinder 114 of the blank feeding means comprises a piston rod 161 (Fig. 10), pivoted at 162 to the lever 153. The other end of the rod reciprocates through one end of a cylinder 163 having its other end pivoted at 164 on the frame. The interior of the cylinder is connected by tubing 113 with one end of the cylinder 112 forming part of the means for reciprocating the bar 105 to eject the box blanks from the hopper as described above.

The mechanism for reciprocating the plunger means for carrying the blanks to the wrappers comprises a cam 166 (Figs. 20 and 21) fixed on shaft 145 and engaging a follower or roller 167 on a connecting rod 168 which has its upper end pivoted at 169 to one end of a lever 170. This lever is pivoted at 171 on the frame and has its opposite end pivoted at 172 to the upper end of a plunger 173 sliding vertically in a bearing 174 on a bracket 175 on the frame. The lower end of this plunger below the bearing has fixed thereon the form block 132 which carries the blank through the folding opening 130 and the opening 133 of the fork frame for assembling it with the wrapper as described above. Connecting rod 168 is provided with a compression spring 176 for holding its follower on the cam and the lower end of the rod is bifurcated to provide spaced arms 177 embracing a collar on shaft 145 to guide the rod for vertical movement.

The means for momentarily discontinuing the movement of the wrapper feeding belt 34 while the blank is pressed against the wrapper comprises, preferably, a cam 178 (Figs. 9, 20, 23 and 24) fixed on shaft 145 and having a high portion 179 arranged to engage a roller 180 on a spring switch arm 181 having a contact 182 normally spaced from a contact 183 and controlling one side of a circuit connected to a power line. This circuit includes a solenoid 184 having its movable armature 185 pivoted at 186 to one end of a lever 187. This lever has its opposite end pivoted at 188 on the frame of the machine while its intermediate portion is pivoted at 189 to one end of a link 190 having its other end connected to a shipper lever 191 pivoted at 192 on the frame. The upper end of the lever engages a clutch part 193 keyed to and sliding on a shaft 194 on which the other clutch part 195 is rotated by gearing as shown. Shaft 194 forms part of a driving connection of the rolls 35 which move the belt 34. A compression spring 196 on a bracket on the frame normally moves the shipper lever to maintain the clutch parts engaged but when the high portion 179 of cam 178 engages the switch arm and closes the circuit, solenoid 184 is energized to disengage the clutch by means of the connections described above. The switch is closed only momentarily during engagement of its arm by the highest point of the cam, these parts being so coordinated that the travel of the belt is stopped only during the instant in which the blank is applied by pressure against the wrapper on the belt.

It is apparent from the above description that for each operating cycle of the wrapping machine, the gluing machine is actuated for a coordinated cycle of operation in which a glue-coated wrapper is deposited on the continuously driven suction belt 34. The wrapper 33 is carried by the belt against the stationary stop fingers 82 which are maintained in contact individually with the belt surface by means of their articulated construction and mounting. The movement of the wrapper by the belt in engagement with these fingers serves to align the wrapper with the path of movement of the belt and also to position it in the same direction with reference to the assembly station. The finger 84 is then moved transversely of the belt along the line of the stop fingers and moves the wrapper to register it in the other direction with the assembly station. In the meantime a blank 97 has been fed from the hopper into registered position under the form block 132 of the plunger means and over the opening 130 in the stationary plate 128. As soon as a wrapper has been registered as described, the plunger descends, carrying the blank down through the first opening 130 to fold its flaps upwardly and then down through the second opening 133 in the frame of the fork 136 and into registered adhesive engagement with the wrapper on the belt below. The plunger means then rises and the fork is moved to transfer the assembled blank and wrapper off the belt and carry it into registry with the plunger means and form block of the wrapping machine by which the assembly is removed from the fork so that it can be retracted for repetition of the cycle. It has been found that by suitably regulating the degree of suction applied to the belt, most wrapper materials may be moved over the surface of the belt as described above without breaking the suction, thus constantly maintaining the wrapper in flat condition on the belt.

My invention thus provides a method and apparatus of relatively simple, direct-acting nature in which the wrappers, while being fed from the gluer on a suction belt and held in flat condition thereon, are directly engaged and moved, partly by the motion of the belt itself and partly by the conjoint action of the stop and pusher devices, to align and register them accurately with an assembled station. The box blanks are fed directly into registry with plunger means at such station which partially folds each blank and carries its center panel into registered adhesion with a wrapper forming the assembly of blank and wrapper on the suction feed belt and in the grip of a transfer fork by which it is transferred directly to the form block of a wrapping machine. By this method the wrapper and blank are rapidly and precisely registered and assembled in a manner capable of being carried out by a relatively simple, efficient and inexpensive machine. The invention further affords a machine having the above characteristics in an accessible, practical and reliable type of construction, with the various other advantageous features pointed out above, both the method and machine being readily adaptable for use with known gluing and wrapping machines.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. The method of wrapping boxes comprising the steps of feeding a wrapper by a surface having a feeding movement, applying suction to hold the wrapper on said surface, interrupting and employing said movement of said wrapper to align and position the same relative to the path of movement of said surface, moving said wrapper on said surface transversely of said path to register said wrapper with a box blank, discontinuing the movement of said surface while continuing the application of said suction and bringing said blank and wrapper into registered adhesive engagement with each other.

2. The method of wrapping boxes comprising the steps of feeding a glue-coated wrapper by a surface having a feeding movement, applying suction to hold the wrapper on said surface, engaging and stopping the wrapper to employ the feeding movement thereof for aligning and positioning the wrapper relative to the path of said moving surface, moving said wrapper in said aligned relation in a direction extending transversely of said path into registry with a box blank, discontinuing the movement of said moving surface while continuing said suction, moving said blank into registered and adhesive engagement with said wrapper and transferring and applying said assembly of blank and wrapper directly to the form block of a wrapping machine.

3. The method of wrapping boxes comprising the steps of feeding a glue-coated wrapper by a surface having a feeding movement, applying suction to hold the wrapper to said surface, engaging and stopping the wrapper to employ the feeding movement thereof for accurately aligning and positioning the wrapper relative to the path of said moving surface, moving said wrapper in said aligned relation in a direction extending transversely of said path into registry with a blank applying station, discontinuing the movement of said surface while continuing said suction, feeding and bending a blank to fold marginal flaps relatively to a central panel thereof moving a central panel of said blank into adhesive engagement with said wrapper, supporting said blank and wrapper by engaging said folded flaps of said blank and transferring and applying said blank directly to the form block of a wrapping machine.

4. A machine for wrapping boxes comprising a member having a movement for feeding wrappers to a blank applying station, stop means arranged to engage a wrapper on said member to employ the feeding movement thereof for turning and positioning the wrapper in line with said station, a device movable transversely of the direction of movement of said member for moving said wrapper into registry with said station, blank feeding means, means at said station for applying a blank to said wrapper, means for interrupting the feeding movement of said member while said blank is being applied, and mechanism for operating said parts in timed coordination with one another, in which said device is a finger having a free end in sliding contact with said member and said mechanism comprises means for reciprocating said finger to push a wrapper transversely of said member in alignment with said stop means intermediate the application of blanks to said member by said blank applying means.

5. A machine for wrapping boxes comprising a member having a movement for feeding wrappers to a blank applying station, stop means arranged to engage a wrapper on said member to employ the feeding movement thereof for turning and positioning the wrapper in line with said station, a device movable transversely of the direction of movement of said member for moving said wrapper into registry with said station, blank feeding means, means at said station for applying a blank to said wrapper, means for interrupting the feeding movement of said member while said blank is being applied, and mechanism for operating said parts in timed coordination with one another, in which said stop means comprises a series of fingers pivotally supported at one end and each resting at its other end in sliding contact with said member with said other ends in alignment with one another transversely of the path of movement of said member.

6. A machine as specified in claim 5 in which said other ends of said fingers are each inclined in the same direction at an angle to a line extending transversely of said member so as to form a series of points lying in said line for contact with a wrapper edge to prevent the transfer of glue from said wrapper to said fingers.

7. A machine for wrapping boxes comprising a member having a feeding movement for feeding glue-coated wrappers to a blank applying station, means for registering a wrapper on said belt with said station, blank feeding means, a blank engaging collar movable toward and from registry with said station, blank bending means for folding marginal flap portions relative to a center panel of said blank to form side walls of the box, said bending means comprising a plunger for bending and moving said blank through said collar to engage said flap portions therewith and said panel with a wrapper registered at said station, means for interrupting the feeding movement of said member while said blank and wrapper are being engaged, means for moving said collar to transfer said blank and wrapper to a wrapping machine, and mechanism for operating said parts in timed coordination with one another.

8. A machine for wrapping boxes comprising a belt having a feeding movement for feeding glue-coated wrappers to a blank applying station, means for registering a wrapper on said belt with said station, blank feeding means, blank bending means at said station for folding marginal flap portions relative to an interior panel of said blank and for applying said panel to said wrapper, means for interrupting the movement of said belt while said blank is being applied to said wrapper, a movably mounted arm between said feeding means and belt provided with a collar having therein an opening with outwardly flared side walls adapted to frictionally engage and hold the folded flap portions of said blank, means for moving said arm to move said collar toward and from registry with said station and transfer a blank and wrapper therefrom to a wrapping machine, and mechanism for operating said parts in timed coordination with one another.

9. A machine for wrapping boxes comprising a wrapping machine having a reciprocating form block, a suction belt for feeding wrappers from a gluing machine to a blank applying station adjacent said wrapping machine, means for registering a wrapper with said station, means for feeding blanks to said station, a blank receiving collar movable toward and from registry with said station, blank bending means for bending marginal flap portions relative to a center panel of said blank, said bending means comprising a plunger for moving said blank through said collar to engage said flap portions therewith and said center panel with a wrapper registered at said station, means for moving said collar into the path of movement of said form block for applying said wrapper directly thereto, and mechanism for operating said parts in timed coordination with one another.

10. A machine for wrapping boxes comprising a wrapping machine having a reciprocating plunger and a form block on said plunger provided with suction means for holding a blank thereon, a suction belt for feeding wrappers from a gluing machine to a blank applying station adjacent said wrapping machine, means for registering a wrapper with said station, means for feeding blanks to said station, a blank receiving collar movable toward and from registry with said station and with said form block and having an open side adapted to pass said plunger, blank bending means for bending marginal flap portions relative to a center panel of said blank, said bending means comprising a plunger for moving said blank through said collar to engage said flap portions therewith and said center panel with a wrapper registered at said station, means for moving said collar into the path of movement of said form block for applying said wrapper directly thereto, and mechanism for operating said parts in timed coordination with one another.

11. A machine for wrapping boxes comprising an endless flexible member movable in a path to feed a wrapper toward a station for assembly with a box blank, and an articulated stop means comprising a series of fingers movably supported at one end for free pivotal movement and having their other ends supported by contact with said member in a line extending transversely of said path to engage and move a wrapper on said member during movement of said member for aligning and positioning said wrapper thereon.

12. A machine for wrapping boxes comprising an endless flexible member movable in a path to feed a wrapper toward a station for assembly with a box blank, means for applying suction through said member to hold a wrapper thereon, and articulated stop means comprising a series of fingers movably supported at one end for free pivotal movement and having their other ends supported by contact with said member in a line extending transversely of said path to engage and move a wrapper on said member during movement thereof for aligning and positioning said wrapper.

13. A machine for wrapping boxes comprising an endless flexible member movable in a path to feed a wrapper toward a station for assembly with a box blank, and articulated stop means comprising a series of fingers movably supported at one end for free pivotal movement and having their other ends supported by contact with said member and terminating substantially in points lying in spaced relation in a line extending transversely of said path for engaging and moving a wrapper on said member to align and position the same on said member.

14. A machine for wrapping boxes comprising an endless flexible member movable in a path to feed a wrapper toward a station for assembly with a box blank, articulated stop means comprising a series of fingers movably supported at one end and having their other ends supported by contact with said member, and a device movable transversely of said path in contact with said member for moving a wrapper thereon, said other finger ends being inclined toward and along the path of active movement of said device to form a series of inclined points in spaced relation in a line for engagement with an edge of the wrapper and along which the wrapper is moved by said device.

15. A machine as specified in claim 14 in which said member is a foraminous belt and provided with means for applying suction therethrough to hold a wrapper thereon.

16. A machine for wrapping boxes comprising an endless flexible member movable in a path to feed a wrapper toward a station for assembly with a box blank and an articulated stop means comprising a spindle, a series of fingers pivotally supported at one end on said spindle in juxtaposed parallel relation with one another and having their other ends supported by said member in continuous contact therewith in a line extending transversely of said path to engage and move a wrapper on said member during movement of said member for aligning and positioning said wrapper thereon, and flexible means for resiliently connecting said fingers together.

17. A machine for wrapping boxes comprising a belt movable in a path to feed a wrapper toward a station for assembly with a box blank, articulated stop means comprising a spindle, a series of fingers pivotally supported at one end and on said spindle in juxtaposed parallel relation with one another and having their other ends supported by said belt for continuous contact individually therewith, a coiled tension spring for resiliently connecting said fingers together, and a device movable transversely of said path in contact with said member for moving a wrapper thereon, said other finger ends being inclined toward and along the path of active movement of said device to form a series of inclined points in spaced relation in a line in engagement with an edge of the wrapper and along which the wrapper is moved by said device.

References Cited in the file of this patent

UNITED STATES PATENTS

| Number | Name | Date |
|---|---|---|
| 1,405,515 | Hughes | Feb. 7, 1922 |
| 1,615,590 | Low | Jan. 25, 1927 |
| 1,803,935 | Federwitz et al. | May 5, 1931 |
| 1,831,236 | Federwitz et al. | Nov. 10, 1931 |
| 1,902,079 | Johnson | Mar. 21, 1933 |
| 1,906,051 | Federwitz | Apr. 25, 1933 |
| 2,144,338 | Lange | Jan. 17, 1939 |
| 2,152,775 | Stokes | Apr. 4, 1939 |